US012274990B2

(12) United States Patent
Kim

(10) Patent No.: US 12,274,990 B2
(45) Date of Patent: Apr. 15, 2025

(54) APPARATUS FOR REMOVING THERMAL STRATIFICATION GENERATED BY TURBULENT PENETRATION BY USING ROTATION OF INNER RING AND OUTER RING

(71) Applicant: KEPCO ENGINEERING & CONSTRUCTION COMPANY, INC., Gyeongsangbuk-do (KR)

(72) Inventor: Kwang Chu Kim, Gimcheon-si (KR)

(73) Assignee: KEPCO ENGINEERING & CONSTRUCTION COMPANY, INC., Gyeongsangbuk-Do (KR)

( * ) Notice: Subject to any disclaimer, the term of this patent is extended or adjusted under 35 U.S.C. 154(b) by 642 days.

(21) Appl. No.: 17/573,526

(22) Filed: Jan. 11, 2022

(65) Prior Publication Data

US 2022/0226788 A1 Jul. 21, 2022

(30) Foreign Application Priority Data

Jan. 18, 2021 (KR) ........................ 10-2021-0006815

(51) Int. Cl.
*B01F 33/453* (2022.01)
*B01F 27/50* (2022.01)
*F15D 1/02* (2006.01)

(52) U.S. Cl.
CPC ............ *B01F 27/50* (2022.01); *B01F 33/453* (2022.01); *B01F 33/4532* (2022.01); *F15D 1/02* (2013.01)

(58) Field of Classification Search
CPC ..................................................... B01F 33/453
(Continued)

(56) References Cited

U.S. PATENT DOCUMENTS 2,827,856 A * 3/1958 Zozulin ................. F04D 13/026 417/420
2,996,363 A * 8/1961 Ruyak ................. B01F 33/4534 417/420
(Continued)

FOREIGN PATENT DOCUMENTS

JP H06-063258 8/1994
JP H07-091447 4/1995
(Continued)

OTHER PUBLICATIONS

Korean Office Action (Application No. 2021-0006815)mailed Jun. 19, 2022 (8pages).

*Primary Examiner* — David L Sorkin
(74) *Attorney, Agent, or Firm* — NIXON PEABODY LLP; Jeffrey L. Costellia

(57) ABSTRACT

Provided is an apparatus for removing thermal stratification generated by turbulent penetration by using a rotation of an inner ring and an outer ring. The apparatus for removing thermal stratification removes thermal stratification formed in a branch pipe branching from a main pipe through which a high-temperature fluid flows, the apparatus including: a hollow body portion coupled to the branch pipe; an inner ring being magnetic and arranged inside the body portion so that an inner circumferential surface thereof is in contact with a fluid; and an outer ring arranged outside the body portion to face the inner ring, the outer ring being magnetic of a polarity opposite to a polarity of the inner ring, wherein, when the outer ring is rotated, the inner ring rotates by a magnetic force.

9 Claims, 6 Drawing Sheets

(58) Field of Classification Search
USPC ........................ 366/273, 274; 416/3; 417/420
See application file for complete search history.

(56) References Cited

U.S. PATENT DOCUMENTS

| | | | | | |
|---|---|---|---|---|---|
| 2,999,673 | A * | 9/1961 | Kessler | B01F 33/45 | 366/273 |
| 3,689,033 | A * | 9/1972 | Holmstrom | B01F 33/452 | 366/279 |
| 5,505,594 | A * | 4/1996 | Sheehan | F04D 13/02 | 415/72 |
| 5,857,842 | A * | 1/1999 | Sheehan | F04C 2/1073 | 417/372 |
| 6,758,593 | B1 * | 7/2004 | Terentiev | F04D 13/027 | 417/420 |
| 9,725,789 | B2 | 8/2017 | Nam et al. | | |

FOREIGN PATENT DOCUMENTS

| | | |
|---|---|---|
| JP | 6118315 | 4/2017 |
| KR | 20-0151829 | 7/2007 |
| KR | 2012-0001413 | 1/2012 |

* cited by examiner

APPARATUS FOR REMOVING THERMAL STRATIFICATION GENERATED BY TURBULENT PENETRATION BY USING ROTATION OF INNER RING AND OUTER RING

CROSS-REFERENCE TO RELATED APPLICATION

This application is based on and claims priority under 35 U.S.C. § 119 to Korean Patent Application No. 10-2021-0006815, filed on Jan. 18, 2021, in the Korean Intellectual Property Office, the disclosure of which is incorporated by reference herein in its entirety.

BACKGROUND

1. Field

The present disclosure relates to an apparatus for removing thermal stratification generated by turbulent penetration by using a rotation of an inner ring and an outer ring, and more particularly, to removal of thermal stratification generated by turbulence penetrating into a branch pipe by using a rotation of an inner ring and an outer ring. The present disclosure relates to an apparatus including an inner ring and an outer ring of different polarities, wherein, when the outer ring is rotated, the inner ring automatically rotates so that a fluid inside a branch pipe is rotated to remove thermal stratification.

2. Description of the Related Art

The present disclosure relates to an apparatus for removing thermal stratification generated by penetration of turbulent eddies from a main pipe through which a high-temperature and high-flow fluid flows into a dead-end branch pipe in various industrial plants.

In detail, as shown in FIG. 1, when the branch pipe is coupled to the main pipe through which the fluid flows, and the branch pipe is isolated by a valve, turbulent eddies penetrate into the branch pipe at an initial stage of plant operation. Such turbulent penetration generates thermal stratification in a horizontal pipe portion of an elbow pipe, as shown in FIG. 2.

Such a thermal stratification phenomenon may generate a bending stress due to a difference in the thermal expansion between the upper end lower parts of a pipe wall, thereby causing serious deformation of the pipe and a support thereof. In particular, when the thermal stratification phenomenon repeats periodically, cracks due to thermal fatigue may occur. In the case of a plant where safety is important, such as a nuclear power plant, it is extremely important to prevent serious damage caused by thermal stratification.

SUMMARY

In order to solve the aforementioned problems, the present disclosure provides an apparatus for removing thermal stratification generated by turbulence penetrating into a branch pipe by using a rotation of an inner ring and an outer ring.

Additional aspects will be set forth in part in the description which follows and, in part, will be apparent from the description, or may be learned by practice of the presented embodiments of the disclosure.

According to an embodiment of the present disclosure, an apparatus for removing thermal stratification generated by turbulent penetration by using a rotation of an inner ring and an outer ring, which is apparatus for removing thermal stratification formed in a branch pipe branching from a main pipe through which a high-temperature fluid flows, includes: a hollow body portion coupled to the branch pipe; an inner ring being magnetic and arranged inside the body portion so that an inner circumferential surface thereof is in contact with a fluid; and an outer ring arranged outside the body portion to face the inner ring, the outer ring being magnetic of a polarity opposite to a polarity of the inner ring, wherein, when the outer ring is rotated, the inner ring rotates by a magnetic force.

Also, the branch pipe may include a first branch pipe branching from the main pipe, an elbow pipe connected to the first branch pipe to change a flow direction of the high-temperature fluid, and a second branch pipe connected to the elbow pipe, wherein the body portion may be between the elbow pipe and the second branch pipe.

Also, the inner ring may include a first magnetic portion having a certain thickness on an outer circumferential surface of the inner ring, the first magnetic portion being magnetic, and the outer ring may include a second magnetic portion having a certain thickness on an inner circumferential surface of the outer ring, the second magnetic portion being magnetic.

Also, an inner diameter of the body portion and an inner diameter of the inner ring may be equal to an inner diameter of the branch pipe.

Also, an insertion groove into which the inner ring is inserted may be formed in an inside part of the body portion, and a mounting groove in which the outer ring is mounted may be formed in an outside part of the body portion.

Also, magnetic materials having a same polarity as the inner ring may be provided on both sides of the insertion groove facing side surfaces of the inner ring.

Also, protrusions may be formed to protrude and to be spaced apart from each other at certain intervals on the inner circumferential surface of the inner ring.

Also, the protrusions may be arranged at intervals of 90° on the inner circumferential surface of the inner ring.

Also, the apparatus may further include a driving part configured to rotate the outer ring, wherein the driving part may include: a first gear portion provided on the outer ring; a second gear portion engaged with the first gear portion; and a power supply source configured to rotate the second gear portion.

Also, an insertion groove into which the inner ring is inserted may be formed inside the body portion, and a width of the insertion groove is greater than a width of the inner ring, and an outer diameter of the insertion groove, formed when a bottom surface of the insertion groove is connected, may be greater than an outer diameter of the inner ring.

Also, the body portion may include a first body coupled to one side of the branch pipe, wherein the first body includes first coupling holes spaced apart from each other in a circumferential direction, and a second body coupled to other side of the branch pipe, wherein the second body includes second coupling holes spaced apart from each other in a circumferential direction, the second coupling hole facing the first coupling hole, the first body and the second body may be fastened by a fastening member inserted into the first coupling hole and the second coupling hole, and the first body may include a groove portion having one open side so that the inner ring is inserted thereinto, and when the second body is fastened to the first body, the second body may block the open side of the groove portion to form the insertion groove into which the inner ring is inserted.

BRIEF DESCRIPTION OF THE DRAWINGS

The above and other aspects, features, and advantages of certain embodiments of the disclosure will be more apparent from the following description taken in conjunction with the accompanying drawings, in which.

DETAILED DESCRIPTION

Figure 1:
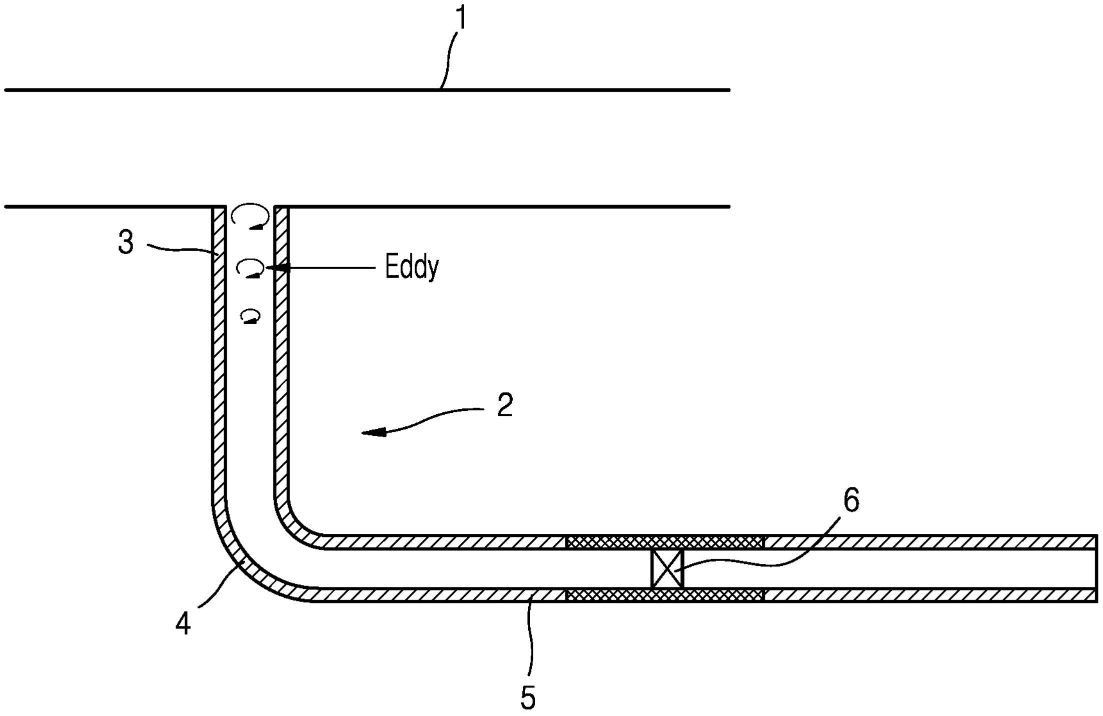
FIG. 1 is a diagram illustrating a state in which turbulence penetrates into a branch pipe.

Reference will now be made in detail to embodiments, examples of which are illustrated in the accompanying drawings, wherein like reference numerals refer to like elements throughout. In this regard, the present embodiments may have different forms and should not be construed as being limited to the descriptions set forth herein. Accordingly, the embodiments are merely described below, by referring to the figures, to explain aspects of the present description. As used herein, the term “and/or” includes any and all combinations of one or more of the associated listed items. Expressions such as “at least one of,” when preceding a list of elements, modify the entire list of elements and do not modify the individual elements of the list.

Hereinafter, various embodiments of the present disclosure will be described with reference to the accompanying drawings. As the present disclosure allows for various changes and numerous embodiments, certain embodiments will be illustrated in the drawings and described in the detailed description. However, various embodiments are not intended to limit the present disclosure to certain embodiments, and should be construed as including all changes, equivalents, and/or alternatives included in the spirit and scope of various embodiments of the present disclosure. With regard to the description of the drawings, similar reference numerals may be used to refer to similar elements.

Expressions such as “include” or “may include” that may be used in various embodiments of the present disclosure specify the presence of a corresponding function, operation, or element, and do not preclude the presence or addition of one or more functions, operations, or elements. Also, it will be understood that terms such as “include” or “comprise” as used in various embodiments of the present disclosure specify the presence of stated features, numbers, steps, operations, elements, parts, and combinations thereof, but do not preclude in advance the presence or addition of one or more other features, numbers, steps, operations, elements, parts, combinations thereof.

It will be understood that when an element is referred to as being “connected” or “coupled” to another element, it may be directly connected or coupled to the other element, or intervening elements may exist between the element and the other element. On the other hand, it will be understood that when an element is referred as being “directly connected” or “directly coupled” to another element, intervening elements may not exist between the element and the other element.

Terms used in various embodiments of the present disclosure are merely used to describe certain embodiments, and are not intended to limit various embodiments of the present disclosure. As used herein, the singular forms “a,” “an,” and “the” are intended to include the plural forms as well, unless the context clearly indicates otherwise.

Unless otherwise defined, all terms used herein including technical or scientific terms have the same meanings as commonly understood by those of ordinary skill in the art to which various embodiments of the present disclosure pertain.

Terms such as those defined in commonly used dictionaries should be interpreted as having meanings consistent with the meanings in the context of the related art, and should not be interpreted in an idealized or overly formal sense, unless explicitly defined in various embodiments of the present disclosure.

Hereinafter, preferred embodiments according to the present disclosure will be described in detail with reference to the accompanying drawings.

Figure 2:
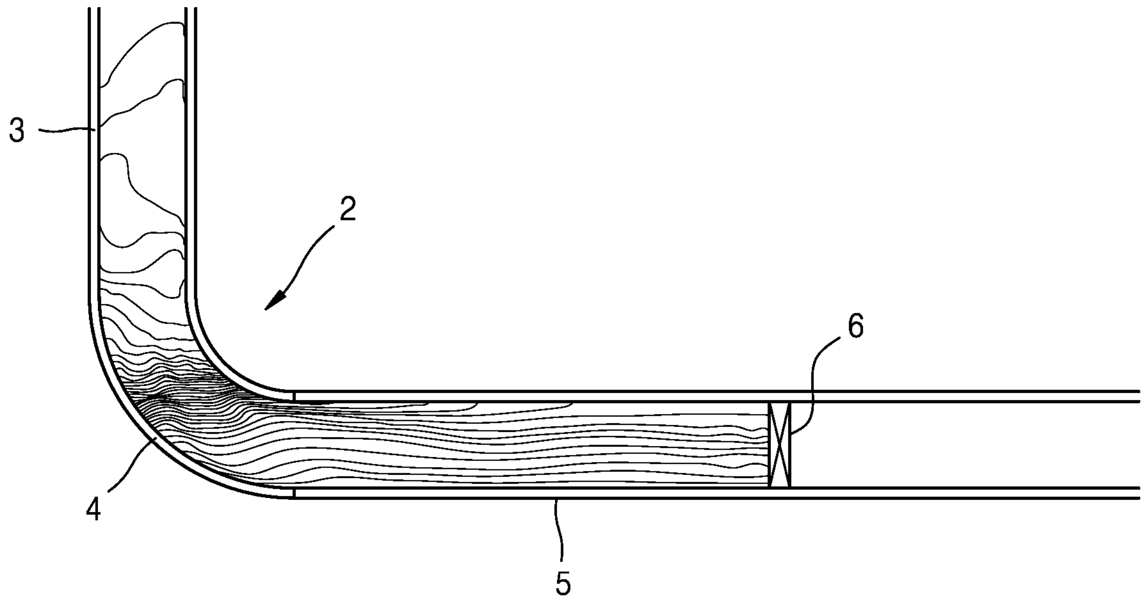
FIG. 2 is a diagram illustrating a state in which thermal stratification is formed in a branch pipe.
Figure 3:
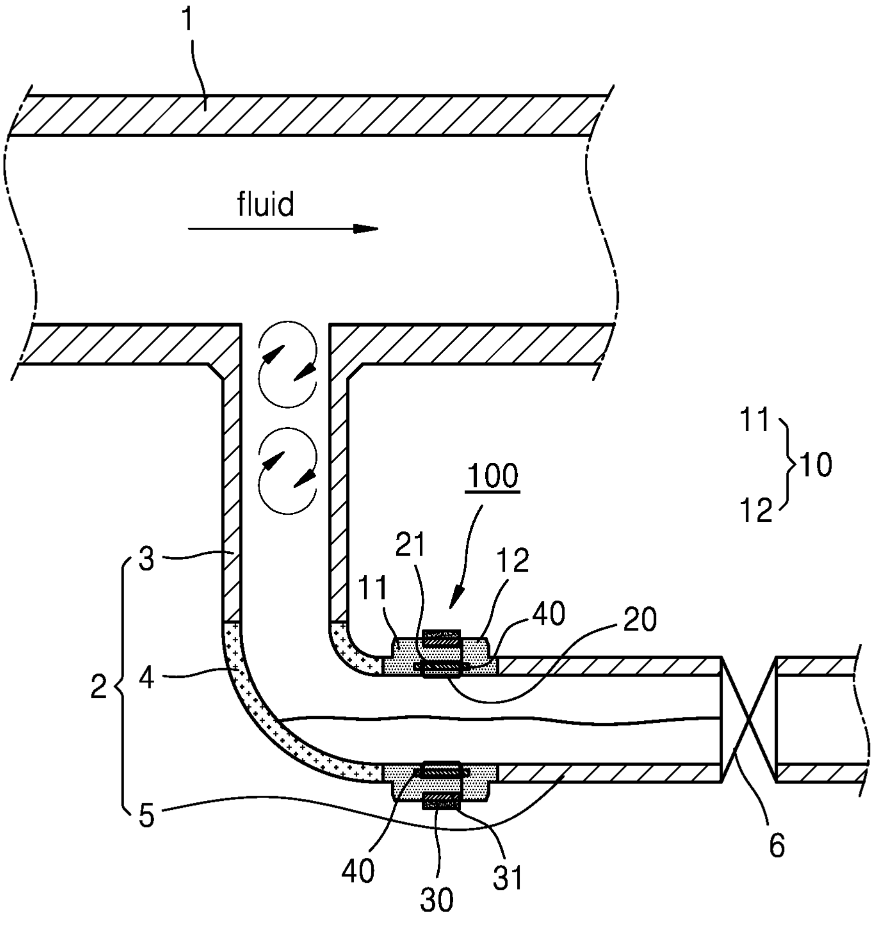
FIG. 3 is a cross-sectional view of a state in which an apparatus for removing thermal stratification is coupled to a branch pipe.
Figure 4:
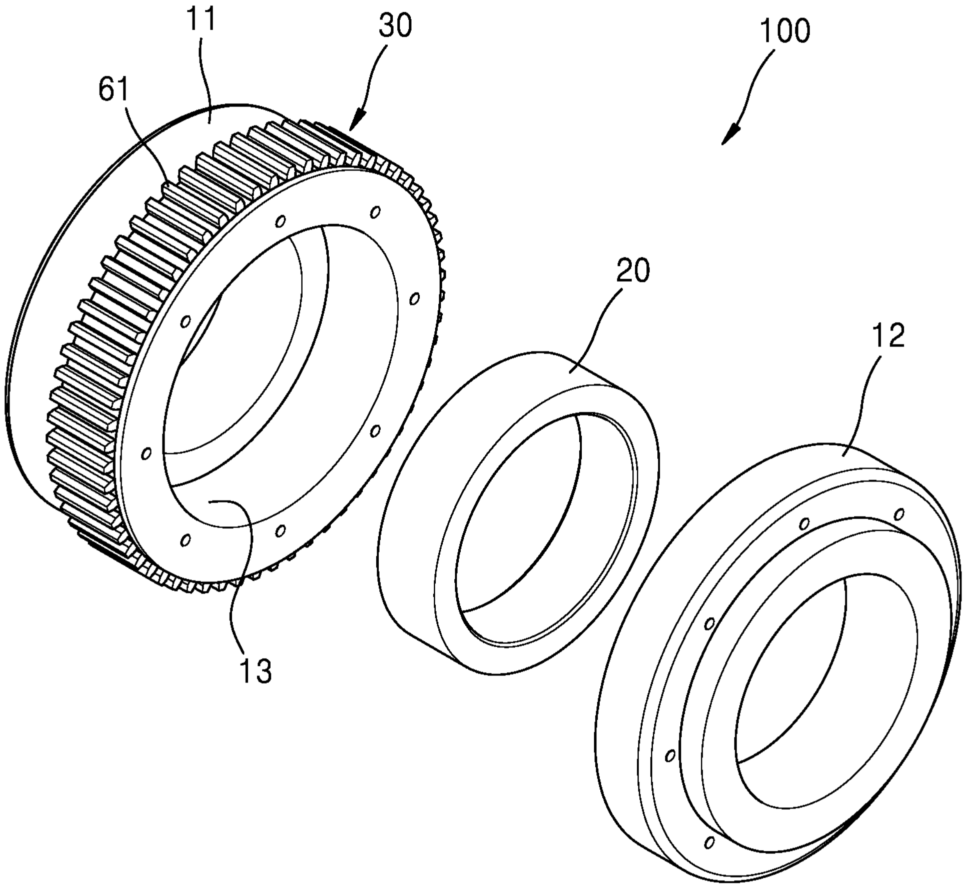
FIG. 4 is a perspective view of an apparatus for removing thermal stratification.
Figure 5:
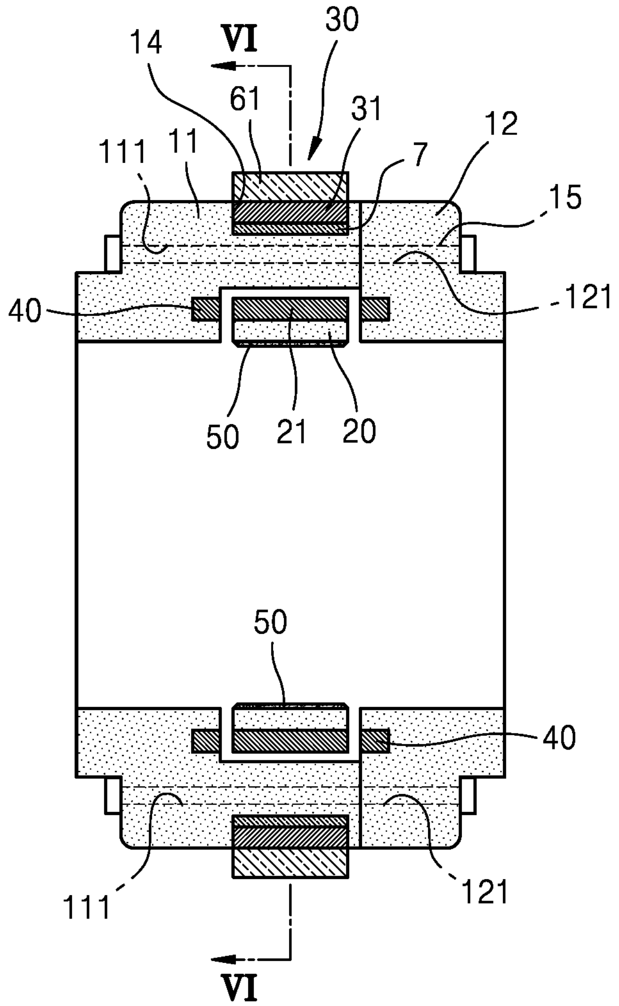
FIG. 5 is an enlarged view illustrating a main part of FIG. 3.
Figure 6:
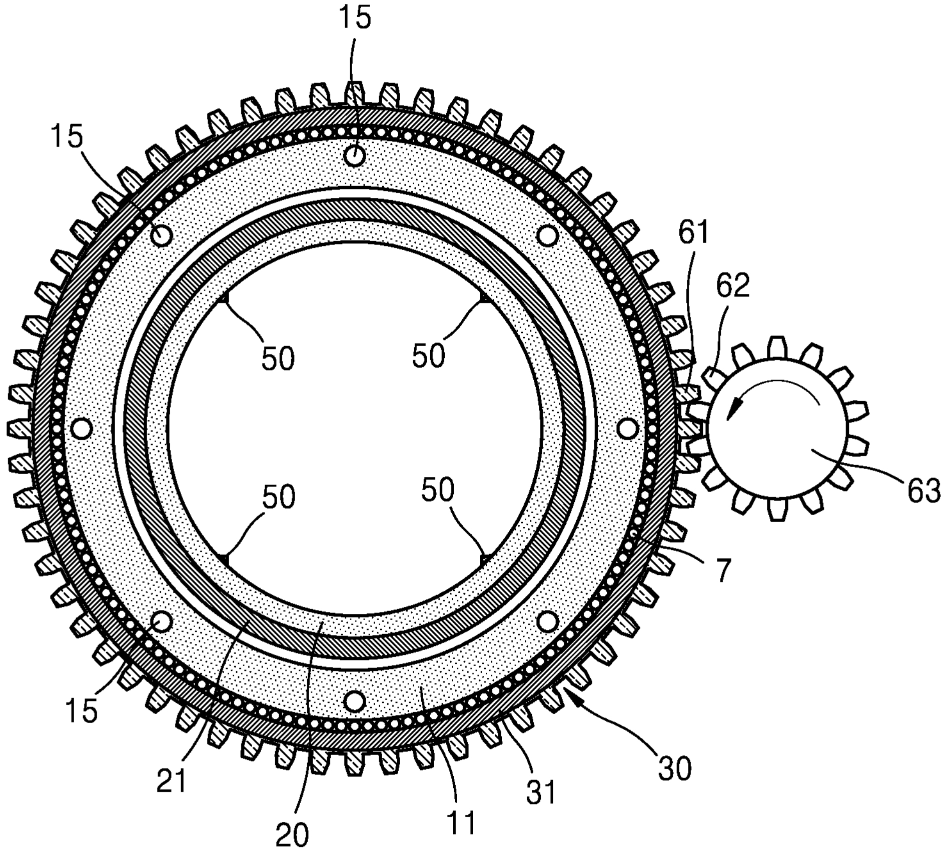
FIG. 6 is a cross-sectional view of FIG. 5 taken along line VI-VI.

FIG. 1 is a diagram illustrating a state in which turbulence penetrates into a branch pipe, and FIG. 2 is a diagram illustrating a state in which thermal stratification is formed in a branch pipe. FIG. 3 is a cross-sectional view of a state in which an apparatus for removing thermal stratification is coupled to a branch pipe, and FIG. 4 is a perspective view of an apparatus for removing thermal stratification. FIG. 5 is an enlarged view illustrating a main part of FIG. 3, and FIG. 6 is a cross-sectional view of FIG. 5 taken along line VI-VI.

First, an apparatus 100 for removing thermal stratification generated by turbulent penetration by using a rotation of an inner ring and an outer ring, according to the present disclosure, is an apparatus for removing thermal stratification generated in a branch pipe 2 when a main pipe 1, through which a high-temperature and high-flow fluid flows, is coupled to the branch pipe 2 that causes the flow of the fluid to branch from the main pipe 1, in various industrial plants. When the branch pipe 2 is closed by a valve 6 at the initial stage of plant operation, turbulent eddies penetrate into the dead-end branch pipe 2. The present disclosure provides an apparatus for removing thermal stratification generated by penetration of turbulence into the stagnant branch pipe 2.

Referring to FIG. 3, the apparatus 100 for removing thermal stratification generated by turbulent penetration by using the rotation of the inner ring and the outer ring removes thermal stratification formed in the branch pipe 2 that branches from the main pipe 1 through which a high-temperature fluid flows. A flow volume flowing through the branch pipe 2 is less than a flow volume of the main pipe 1. According to the present embodiment, the apparatus 100 for removing thermal stratification includes a body portion 10, an inner ring 20, and an outer ring 30.

Referring to FIGS. 3 and 4, the body portion 10 is a hollow member coupled to the branch pipe 2. The body portion 10 includes a first body 11 coupled to one side of the branch pipe 2 and including a first coupling hole 111 spaced apart in a circumferential direction, and a second body 12 coupled to the other side of the branch pipe 2 and including a second coupling hole 121 spaced apart in a circumferential direction, the second coupling hole 121 facing the first coupling hole 111. The first body 11 and the second body 12 are coupled to each other to form one body portion 10 and have a hollow shape so that a fluid may flow therein.

The inner ring 20, which is a circular ring arranged inside the body portion 10, is magnetic and has an inner circumferential surface in contact with the fluid flowing through the branch pipe 2. When the outer ring 30 to be described below is rotated, the inner ring 20 automatically rotates by a magnetic force. When the inner ring 20 rotates, it means that the inner ring 20 rotates around the center of a diameter of the branch pipe 2.

According to the present embodiment, an inner diameter of the body portion 10 and an inner diameter of the inner ring 20 are formed to be equal to an inner diameter of the branch pipe 2. An insertion groove 13 into which the inner ring 20 is inserted is formed inside the body portion 10. In a state in which the inner ring 20 is inserted into the insertion groove 13, the inner diameter of the inner ring 20 is formed to be equal to the inner diameter of the branch pipe 2. The inner circumferential surface of the inner ring 20 and an inner circumferential surface of the body portion 10 form a pipe wall together with an inner circumferential surface of the branch pipe 2. The rotation of the inner ring 20 acts as though a part of the pipe wall is rotated.

The outer ring 30 is arranged outside the body portion 10 to face the inner ring 20. The outer ring 30 has a polarity opposite to a polarity of the inner ring 20. The outer ring 30 is rotated by a driving part 60, and when the outer ring 30 is rotated, the inner ring 20 automatically rotates by a magnetic force of the outer ring 30. According to the present embodiment, a mounting groove 14 in which the outer ring 30 is mounted is formed outside the body portion 10. The outer ring 30 is rotated around the center of the branch pipe 2 in a state of being mounted in the mounting groove 14. A rolling bearing 7 is between the outer ring 30 and the body portion 10 so that the outer ring 30 may be smoothly rotated.

As shown in FIG. 3, according to the present embodiment, the branch pipe 2 includes a first branch pipe 3, an elbow pipe 4, and a second branch pipe 5. The first branch pipe 3 is a pipe directly connected to the main pipe 1 so that the fluid flowing through the main pipe 1 branches therefrom. The elbow pipe 4 is a curved pipe which is connected to the first branch pipe 3 and provided to change a flow direction of the fluid. The second branch pipe 5 is a pipe connected to the elbow pipe 4 to transfer the fluid branching from the main pipe 1 to a certain location, and is provided as a straight line according to the present embodiment.

In the apparatus 100 for removing thermal stratification generated by turbulent penetration by using the rotation of the inner ring and the outer ring according to the present embodiment, in the case of the branch pipe 2 including the elbow pipe 4 as described above, the body portion 10 is between the elbow pipe 4 and the second branch pipe 5.

As shown in FIG. 2, in a pipe system including the elbow pipe 4, in which the flow direction of the fluid is changed, during operation, thermal stratification is generated at a point where the elbow pipe 4 and the second branch pipe 5 extending in a straight line come into contact and affects surrounding parts. Accordingly, the apparatus 100 for removing thermal stratification according to the present disclosure is provided at a point where the elbow pipe 4 and the second branch pipe 5 come into contact, so that concentrated formation of thermal stratification may be eliminated at an initial stage. The first body 11 is coupled to the elbow pipe 4 and the second body 12 is coupled to the second branch pipe 5.

The structure and coupling relationship of the body portion 10, the inner ring 20, and the outer ring 30 will be described in greater detail.

As shown in FIGS. 4 and 5, according to the present embodiment, the first body 11 and the second body 12 of the body portion 10 are fastened by a fastening member 15. The fastening member 15 is inserted into the first coupling hole 111 of the first body 11 and the second coupling hole 121 of the second body 12, and the first and second coupling holes 111 and 121 are provided in the circumferential directions of the first and second bodies 11 and 12, so that the fastening member 15 are provided as a plurality of fastening members 15. The fastening member 15 may pass through the first coupling hole 111 and the second coupling hole 121, and a nut may be coupled and fixed to an end of the fastening member 15.

The first body 11 includes a groove portion having one open side so that the inner ring 20 is inserted thereinto. In addition, when the second body 12 is fastened to the first body 11, the second body 12 blocks the open side of the groove portion to form the insertion groove 13 into which the inner ring 20 is inserted.

According to the present embodiment, the inner ring 20 is formed to be magnetized by a first magnetic portion 21. The first magnetic portion 21 is formed at a certain thickness on an outer circumferential surface of the inner ring 20. In addition, the outer ring 30 is formed to be magnetized by a second magnetic portion 31. The second magnetic portion 31 has a polarity opposite to a polarity of the first magnetic portion 21. The second magnetic portion 31 is formed at a certain thickness on an outer circumferential surface of the outer ring 30.

The inner ring 20 and the outer ring 30 face each other with opposite polarities. The body portion 10 includes a material capable of transmitting a magnetic force. An attractive force acts between the inner ring 20 and the outer ring 30, and when the outer ring 30 is rotated, the inner ring 20 rotates together with the outer ring 30. The first magnetic portion 21 is provided on the outer circumferential surface of the inner ring 20 and the second magnetic portion 31 is provided on an inner circumferential surface of the outer ring 30, so that an attractive force generated by the first and second magnetic portions 21 and 31 may act as much as possible.

Also, according to the present embodiment, magnetic materials 40 having the same polarity as the inner ring 20 are provided on both sides of the insertion groove 13 facing the side surfaces of the inner ring 20. In addition, a width of the insertion groove 13 is greater than a width of the inner ring 20, and an outer diameter of the insertion groove 13, formed when the bottom surface of the insertion groove 13 is connected, is greater than an outer diameter of the inner ring 20. That is, when the inner ring 20 is inserted into the insertion groove 13, the inner ring 20 may be arranged with a certain space from both sides and the bottom surface of the insertion groove 13. Such arrangement is made possible by polarities of the inner ring 20, the outer ring 30, and the magnetic materials 40.

In detail, a repulsive force acts between the magnetic materials 40 and the inner ring 20, so that the inner ring 20 is pushed from both sides of the insertion groove 13 to be spaced apart by a certain distance and to be able to rotate. That is, a certain gap is formed between the side surfaces of the inner ring 20 and both sides of the insertion groove 13. Also, because the inner ring 20 and the outer ring 30 have the same polarity, an attractive force acts between the inner ring 20 and the outer ring 30, and as a result of the attractive force acting in all directions in a circumferential direction because the inner ring 20 and the outer ring 30 are arranged in a circular shape, the inner ring 20 and the outer ring 30 may be spaced apart from each other by a certain space.

According to an embodiment of the present disclosure, the driving part 60 is provided to rotate the outer ring 30. The driving part 60 includes a first gear portion 61, a second gear portion 62, and a power supply source 63.

The first gear portion 61 is provided in the outer ring 30. As shown in FIG. 6, the first gear portion 61 is provided on the outer circumferential surface of the outer ring 30. The second gear portion 62 is arranged to be engaged with the first gear portion 61. The power supply source 63 rotates the second gear portion 62. When the first and second gear portions 61 and 62 are engaged and rotated, the outer ring 30 is rotated, and when the outer ring 30 is rotated, the inner ring 20 rotates together by a magnetic force, so that the fluid filled in the branch pipe 2 is rotated and mixed by a frictional force.

According to the present embodiment as described above, the driving part 60 uses the first and second gear portions 61 and 62, and the first and second gear portions 61 and 62 are adjacent to each other, so that an excessive space is not required to install the driving part 60.

According to the present embodiment, protrusions 50 that increase rotation of the fluid are formed to protrude from the inner circumferential surface of the inner ring 20. When the valve 6 provided in the branch pipe 2 is open to allow the flow of the fluid, each of the protrusions 50 is formed in a size that does not affect the flow of the fluid in the branch pipe 2, for example, about 3% to about 5% of the inner diameter of the branch pipe 2.

According to the present embodiment, the protrusions 50 are formed to protrude and to be spaced apart from each other at certain intervals on the inner circumferential surface of the inner ring 20. A cross-section of each of the protrusions 50 has a substantially triangular shape to increase a rotational force of the fluid when the inner ring 20 rotates in a state in which the valve 6 is closed. Also, the protrusions 50 are formed to an extent that does not interfere with the flow of the fluid and cause no pressure drop when the valve 6 is opened and the fluid flows through the second branch pipe 5. According to the present embodiment, the protrusions 50 are provided as four protrusions 50 arranged at intervals of 90° on the inner circumferential surface of the inner ring 20. The number of the protrusions 50 is not limited to four, but because the flow of the fluid may be inhibited as the number of the protrusions 50 increases, three or four protrusions 50 may be formed.

Hereinafter, the operation and effect of the apparatus 100 for removing thermal stratification generated by turbulent penetration by using the rotation of the inner ring and the outer ring according to the aforementioned configuration will be described in detail.

In industrial plants, the main pipe 1 through which a high-temperature and high-flow fluid flows is provided, and the branch pipe 2 branching from the main pipe 1 to supply the fluid to a desired location is provided. According to the present embodiment, the branch pipe 2 branching from the main pipe 1 is provided by being connected in order from the main pipe 1 to the first branch pipe 3, the elbow pipe 4, and the second branch pipe 5.

When the fluid flows along the main pipe 1 and does not flow along the branch pipe 2, the valve 6 provided in the branch pipe 2 is closed, for example, at an initial stage of operation or according to necessary conditions. In this case, a turbulent penetration phenomenon occurs in which the fluid flowing along the main pipe 1 penetrates into the branch pipe 2, and thermal stratification is formed by the turbulent penetration phenomenon. As in the present embodiment, in the case of the branch pipe 2 including the elbow pipe 4, thermal stratification is actively generated at a point where the elbow pipe 4 and the second branch pipe 5 are connected, and spreads to the second branch pipe 5.

The apparatus 100 for removing thermal stratification generated by turbulent penetration by using the rotation of the inner ring and the outer ring, according to the embodiment of the present disclosure, is between the elbow pipe 4 and the second branch pipe 5. According to the embodiment of the present disclosure, the apparatus 100 for removing thermal stratification is modularized and manufactured in advance, and then coupled between the elbow pipe 4 and the second branch pipe 5. An open groove portion into which the inner ring 20 is inserted is formed in the first body 11, the inner ring 20 is inserted into the open groove portion, and the second body 12 is arranged adjacent to the groove portion, and then the first and second bodies 11 and 12 are fastened by the fastening member 15. By the process as described above, the inner ring 20 may be easily accommodated in the body portion 10 to be modularized.

According to the present embodiment, because the body portion 10 is coupled between the elbow pipe 4 and the second branch pipe 5, the first body 11 of the body portion 10 is coupled to the elbow pipe 4, and the second body 12 is coupled to the second branch pipe 5. The body portion 10 is welded and coupled to the branch pipe 2.

The apparatus 100 for removing thermal stratification according to the present disclosure is completely installed in a state in which the first gear portion 61 of the outer ring 30 is engaged with the second gear portion 62. When the valve 6 that opens and closes the branch pipe 2 is closed and the fluid flows along the main pipe 1, the first gear portion 61 is rotated as the second gear portion 62 is rotated by the power supply source 63, and the inner ring 20 automatically rotates by a magnetic force as the outer ring 30 is rotated according to the rotation of the first gear portion 61. The fluid is rotated and mixed according to the rotation of the inner ring 20, so that thermal stratification at the point where the elbow pipe 4 and the second branch pipe 5 are connected is removed.

As described above, the apparatus 100 for removing thermal stratification generated by turbulent penetration by using the rotation of the inner ring and the outer ring, according to the embodiment of the present disclosure, efficiently removes thermal stratification generated by turbulent eddies penetrating into the branch pipe 2 closed by the valve 6.

Because the inner ring 20 rotates by a magnetic force when the outer ring 30 is rotated, there is no concern about mechanical abrasion of the inner ring 20, and because the body portion 10 is between the inner ring 20 and the outer ring 30, a leakage of the fluid may be prevented. Also, the first magnetic portion 21 is provided on the outer circumferential surface of the inner ring 20, and the outer ring 30 is provided on the inner circumferential surface of the outer ring 30, so that an attractive force between the inner ring 20 and the outer ring 30 may be utilized as much as possible.

Also, the apparatus 100 for removing thermal stratification is modularized as described above and thus may be easily installed without changing the existing pipe network, and the apparatus 100 for removing thermal stratification is between the elbow pipe 4 and the second branch pipe 5 and thus provides easy maintenance. Accordingly, the apparatus

100 for removing thermal stratification may be easily installed in plants in operation or in which construction is completed or is in progress.

When the valve 6 of the branch pipe 2 is opened and the fluid flows through the branch pipe 2, in the apparatus 100 for removing thermal stratification according to the present disclosure, a separate structure is not installed inside a pipe, which does not interfere with the flow of the fluid, and thus, pressure loss does not occur. Also, because scattered materials are not generated due to damage of the separate structure, additional device damage due to the scattered materials may be prevented in advance, and when the apparatus 100 for removing thermal stratification is applied to a nuclear power plant, safety may be greatly improved.

The apparatus 100 for removing thermal stratification according to the present disclosure may sufficiently remove thermal stratification without rotating the rotator 20 at a high speed. For example, a sufficient effect may be achieved at a speed of about 10 revolutions/minute to about 13 revolutions/minute (10 rpm to 13 rpm). Also, when the valve 6 of the branch pipe 2 is opened and the fluid flows through the branch pipe 2, the apparatus 100 for removing thermal stratification according to the present disclosure may be stopped, so that a large electric load is not required for the operation.

In addition, because the thermal stratification is blocked in advance, a pipe integrity evaluation on thermal stratification or thermal fatigue through experiments or computational analysis may be omitted, and because there is no need to install an ultrasonic monitoring facility or the like to check the condition of the inside of a pipe, costs required for facilities may be reduced.

The apparatus for removing thermal stratification generated by turbulent penetration by using the rotation of the inner ring and the outer ring, according to the present disclosure, may remove thermal stratification generated by turbulence penetrating into a branch pipe by using the rotation of the inner ring and the outer ring.

Also, when the outer ring is rotated, the inner ring automatically rotates by a magnetic force, and a viscous fluid is rotated together by a frictional force with the rotating inner ring to remove thermal stratification, so that the thermal stratification may be removed with a relatively small rotational force, and pipe vibration or the like may not be affected.

In addition, the apparatus for removing thermal stratification may be modularized and installed, and thus, installation thereof is possible without changing the layout of the existing pipe network.

Moreover, when the branch pipe includes a first branch pipe, an elbow pipe, and a second branch pipe, during operation, thermal stratification starts at a point where the elbow pipe and the second branch pipe are connected, the apparatus for removing thermal stratification according to the present disclosure is installed at the point where the elbow pipe and the second branch pipe are connected and efficiently removes the thermal stratification with a small rotational force in the initial stage.

Also, because a separate structure colliding with a fluid in the pipe to remove thermal stratification is not installed, the fluid may smoothly flow to prevent pressure drop loss due to the separate structure in advance. Further, because the separate structure is not installed, not only costs may be reduced, but also device damage caused by the separate structure being damaged by the flow of the fluid may be prevented. That is, when the structure is damaged due to the flow of the fluid, fragments may be generated, and the fragments may cause serious damage not only to the pipe system but also to other devices into which the fluid flows. The present disclosure may prevent such damage. When the present disclosure is applied to a nuclear power plant, accidents caused by the fragments may be prevented, thereby greatly improving safety.

Also, because thermal stratification generated in the branch pipe is removed in advance, the installation of ultrasonic monitoring equipment for pipe integrity evaluation may be omitted, thereby reducing enormous costs required for such equipment.

It should be understood that embodiments described herein should be considered in a descriptive sense only and not for purposes of limitation. Descriptions of features or aspects within each of the embodiments should typically be considered as available for other similar features or aspects in other embodiments. While one or more embodiments have been described with reference to the figures, it will be understood by those of ordinary skill in the art that various changes in form and details may be made therein without departing from the spirit and scope of the disclosure as defined by the following claims.

What is claimed is:

1. An apparatus for removing thermal stratification generated by turbulent penetration by using a rotation of an inner ring and an outer ring, which is apparatus for removing thermal stratification formed in a branch pipe branching from a main pipe through which a high-temperature fluid flows, the apparatus comprising:

a hollow body portion coupled to the branch pipe;

an inner ring being magnetic and arranged inside the body portion so that an inner circumferential surface thereof is in contact with a fluid; and an outer ring arranged outside the body portion to face the inner ring, the outer ring being magnetic of a polarity opposite to a polarity of the inner ring, wherein, when the outer ring is rotated, the inner ring rotates by a magnetic force, wherein an insertion groove into which the inner ring is inserted is formed in an inside part of the body portion, and a mounting groove in which the outer ring is mounted is formed in an outside part of the body portion, and wherein magnetic materials having a same polarity as the inner ring are provided on both sides of the insertion groove facing side surfaces of the inner ring.

2. The apparatus of claim 1, wherein, the branch pipe includes a first branch pipe branching from the main pipe, an elbow pipe connected to the first branch pipe to change a flow direction of the high-temperature fluid, and a second branch pipe connected to the elbow pipe, wherein the body portion is between the elbow pipe and the second branch pipe.

3. The apparatus of claim 1, wherein the inner ring includes a first magnetic portion having a certain thickness on an outer circumferential surface of the inner ring, the first magnetic portion being magnetic, and the outer ring includes a second magnetic portion having a certain thickness on an inner circumferential surface of the outer ring, the second magnetic portion being magnetic.

4. The apparatus of claim 1, wherein an inner diameter of the body portion and an inner diameter of the inner ring are equal to an inner diameter of the branch pipe.

5. The apparatus of claim 1, wherein protrusions are formed to protrude and to be spaced apart from each other at certain intervals on the inner circumferential surface of the inner ring.

6. The apparatus of claim 5, wherein the protrusions are arranged at intervals of 90° on the inner circumferential surface of the inner ring.

7. The apparatus of claim 1, further comprising a driving part configured to rotate the outer ring, wherein the driving part includes:

a first gear portion provided on the outer ring;

a second gear portion engaged with the first gear portion; and a power supply source configured to rotate the second gear portion.

8. The apparatus of claim 1, wherein a width of the insertion groove is greater than a width of the inner ring, and an outer diameter of the insertion groove, formed when a bottom surface of the insertion groove is connected, is greater than an outer diameter of the inner ring.

9. The apparatus of claim 1, wherein the body portion includes a first body coupled to one side of the branch pipe, wherein the first body includes first coupling holes spaced apart from each other in a circumferential direction, and a second body coupled to other side of the branch pipe, wherein the second body includes second coupling holes spaced apart from each other in a circumferential direction, the second coupling hole facing the first coupling hole, the first body and the second body are fastened by a fastening member inserted into the first coupling hole and the second coupling hole, the first body includes a groove portion having one open side so that the inner ring is inserted thereinto, and when the second body is fastened to the first body, the second body blocks the open side of the groove portion to form the insertion groove into which the inner ring is inserted.

* * * * *